United States Patent
Shinoda et al.

(10) Patent No.: US 10,007,036 B2
(45) Date of Patent: Jun. 26, 2018

(54) IMAGE DISPLAY, LABELED ARTICLE, AND METHODS OF MANUFACTURING THEREOF

(75) Inventors: Koichi Shinoda, Tokyo (JP); Hirotaka Kobayashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 533 days.

(21) Appl. No.: 13/444,261

(22) Filed: Apr. 11, 2012

(65) Prior Publication Data

US 2012/0194884 A1    Aug. 2, 2012

Related U.S. Application Data

(63) Continuation of application No. PCT/JP2010/063326, filed on Aug. 5, 2010.

(30) Foreign Application Priority Data

Oct. 16, 2009 (JP) .................................. 2009-239429
Nov. 9, 2009 (JP) .................................. 2009-255973

(51) Int. Cl.
*G03H 1/00* (2006.01)
*G02B 5/18* (2006.01)
(Continued)

(52) U.S. Cl.
CPC ......... *G02B 5/1842* (2013.01); *B42D 25/328* (2014.10); *G02B 5/32* (2013.01);
(Continued)

(58) Field of Classification Search
CPC ..... G03H 1/0011; B42D 15/105; B42D 15/10
(Continued)

(56) References Cited

U.S. PATENT DOCUMENTS 4,856,857 A * 8/1989 Takeuchi ............. G03H 1/0244
283/72
5,344,808 A    9/1994 Watanabe et al.
(Continued)

FOREIGN PATENT DOCUMENTS

CN           1402181         3/2003
EP      0 587 148 A2         3/1994
(Continued)

OTHER PUBLICATIONS

Chinese Office Action dated Dec. 30, 2013 in corresponding Chinese Application No. 201080046583.1.
(Continued)

*Primary Examiner* — Robert E Tallman

(57) ABSTRACT

An image display is to be transferred from a support onto a substrate and displays an image including personal information. The image display includes a base layer releasably supported by the support and having a light-transmitting property, and an image display layer including a hologram and/or diffraction grating and transferred onto the base layer by a thermal transfer method using a thermal head. The image display layer displays an image including at least a piece of the personal information. An individual authentication medium including the image display, and manufacturing methods of the image display and individual authentication medium are also described.

15 Claims, 10 Drawing Sheets

(51) Int. Cl.
*G02B 5/32* (2006.01)
*G09F 3/00* (2006.01)
*B42D 25/328* (2014.01)
*B44C 1/16* (2006.01)

(52) U.S. Cl.
CPC ........ *G09F 3/0292* (2013.01); *B42D 2033/20* (2013.01); *B42D 2035/06* (2013.01); *B42D 2035/50* (2013.01); *B44C 1/16* (2013.01)

(58) Field of Classification Search
USPC .... 359/1, 2, 13–16, 130, 630; 245/7–9, 418; 283/86
See application file for complete search history.

(56) References Cited

U.S. PATENT DOCUMENTS

| | | | |
|---|---|---|---|
| 8,725,589 B1* | 5/2014 | Skelding | G06Q 20/341 156/42 |
| 2002/0018430 A1 | 2/2002 | Heckenkamp et al. | |
| 2005/0010776 A1* | 1/2005 | Kenen | G06Q 20/341 713/176 |
| 2005/0161512 A1* | 7/2005 | Jones et al. | 235/487 |
| 2008/0009412 A1* | 1/2008 | Funada et al. | 503/200 |
| 2008/0316556 A1* | 12/2008 | Eto | B42D 25/29 359/3 |
| 2011/0239885 A1* | 10/2011 | Marchant | B41M 3/148 101/483 |
| 2012/0194884 A1 | 8/2012 | Shinoda et al. | |

FOREIGN PATENT DOCUMENTS

| | | |
|---|---|---|
| EP | 2 489 525 A1 | 8/2012 |
| JP | 7-104113 | 4/1995 |
| JP | 2000-141863 | 5/2000 |
| JP | 2000-272276 | 10/2000 |
| JP | 2002-226740 | 8/2002 |
| JP | 2003-170685 | 6/2003 |
| JP | 2006-82545 | 3/2006 |
| JP | 2006-248137 | 9/2006 |
| JP | 2008-188866 | 8/2008 |
| JP | 4616727 | 10/2010 |
| KR | 10-2007-0045035 | 5/2007 |
| WO | WO 2005/097515 A1 | 10/2005 |
| WO | WO 2011/045972 A1 | 4/2011 |

OTHER PUBLICATIONS

International Search Report for PCT/JP2010/063326 dated Aug. 31, 2010.
International Preliminary Report on Patentability dated May 24, 2012 for corresponding International Application No. PCT/JP2010/063326.
Chinese Office Action dated Jul. 28, 2014 in corresponding Chinese Patent Application No. 201080046583.1.
Canadian Office Action dated Jun. 22, 2016 in corresponding Canadian Patent Application No. 2,777,383.
Extended European Search Report dated Jun. 29, 2016 in corresponding European Patent Application No. 10823240.6.
Korean Office Action dated Aug. 23, 2016 in corresponding Korean Patent Application No. 10-2012-7009573.

* cited by examiner

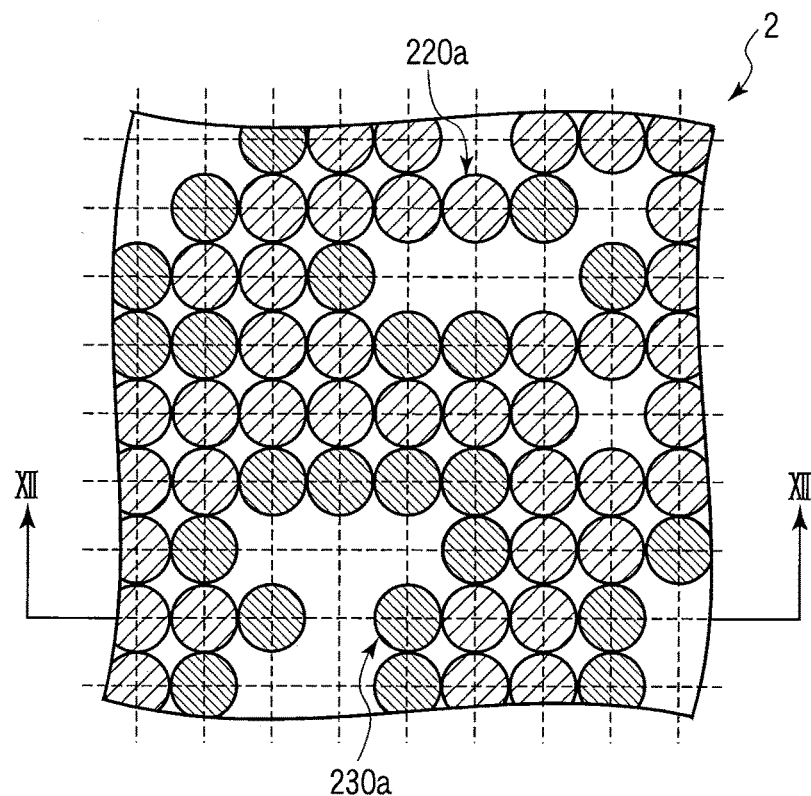
F I G. 11
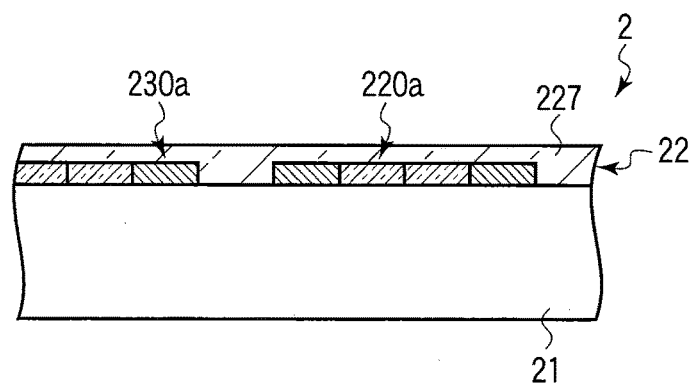
F I G. 12

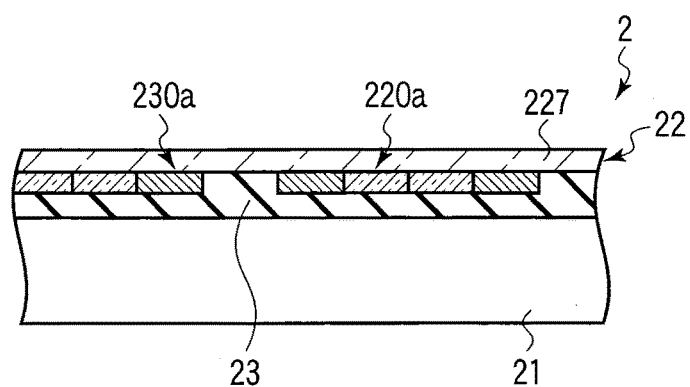
F I G. 20
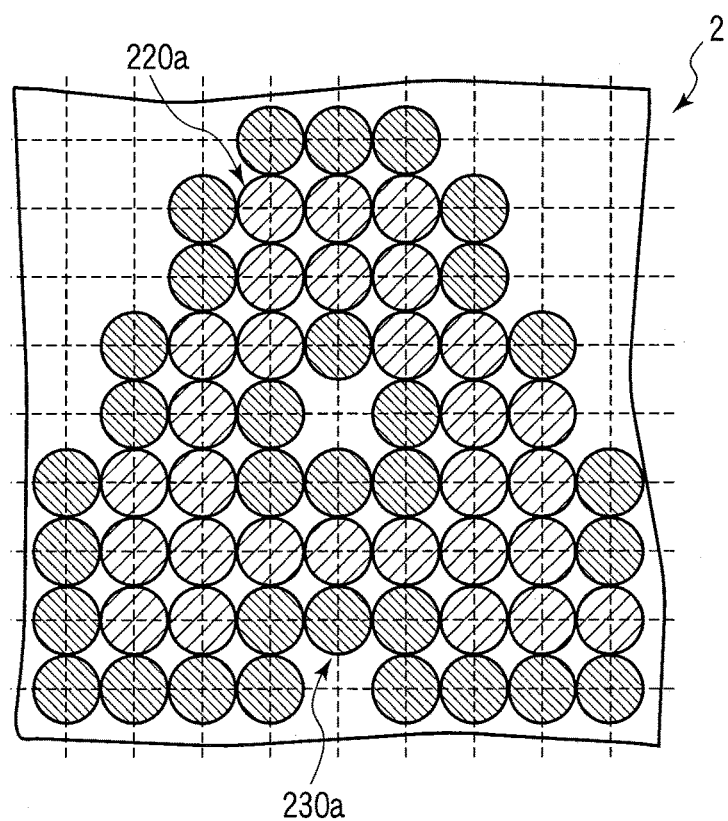
F I G. 21

IMAGE DISPLAY, LABELED ARTICLE, AND METHODS OF MANUFACTURING THEREOF

CROSS REFERENCE TO RELATED APPLICATIONS

This application is a Continuation Application of PCT Application No. PCT/JP2010/063326, filed Aug. 5, 2010 and based upon and claiming the benefit of priority from prior Japanese Patent Applications No. 2009-239429, filed Oct. 16, 2009; and No. 2009-255973, filed Nov. 9, 2009, the entire contents of all of which are incorporated herein by reference.

BACKGROUND OF THE INVENTION

1. Field of the Invention

The present invention relates to an image display technique.

2. Description of the Related Art

Many individual authentication media such as passport and identification (ID) card use facial images in order to allow individual authentication with visual check.

In the past, for example, a photographic paper having a facial image printed thereon was adhered to a booklet so as to issue a passport. Such a passport, however, may be tampered by replacing the photographic printing with another one.

For this reason, in recent years, information about the facial image tends to be digitalized, and the digitalized information is reproduced on the booklet. For example, thermal transfer recording method using a transfer ribbon is considered as the method for reproducing the image.

However, printers of thermal transfer recording method using sublimation dye or colored thermoplastic resin are widely available in recent years. In view of such circumstances, it is not necessarily difficult to remove the facial image from the passport and record another facial image thereon.

Jpn. Pat. Appln. KOKAI Publication No. 2000-141863 describes that a facial image is recorded by the above method, and the same facial image is further recorded thereon using fluorescent ink. Jpn. Pat. Appln. KOKAI Publication No. 2002-226740 describes that a facial image is recorded using ink containing colorless or light-colored fluorescent dye and colored pigments. Jpn. Pat. Appln. KOKAI Publication No. 2003-170685 describes that an ordinary facial image and a facial image formed with pearl pigments are arranged side by side.

When these techniques are applied to a passport, it is difficult to tamper with the passport. However, the facial image recorded using fluorescent material cannot be perceived unless a special light source such as an ultraviolet lamp is used. Although the facial image formed with pearl pigments can be perceived with unaided eyes, the particle sizes of pearl pigments are large, and therefore, it is difficult to form a high-resolution image using this.

BRIEF SUMMARY OF THE INVENTION

An object of the present invention is to provide an image display that displays a high quality image and is hard to tamper with information thereon.

According to a first aspect of the present invention, there is provided an image display that is to be transferred from a support onto a substrate and displays an image including personal information, comprising a base layer releasably supported by the support and having a light-transmitting property, and a first image display layer including a hologram and/or diffraction grating and transferred onto the base layer by a thermal transfer method using a thermal head, the first image display layer displaying a first image including at least a piece of the personal information.

According to a second aspect of the present invention, there is provided an individual authentication medium comprising the image display according to the first aspect, and the substrate having the image display transferred from the support.

According to a third aspect of the present invention, there is provided a method of manufacturing an image display that is to be transferred from a support onto a substrate and displays an image including personal information, comprising transferring a part of a transfer material layer including a hologram and/or diffraction grating onto the base layer releasably supported by the support by a thermal transfer method using a thermal head so as to form an image display layer on the base layer, the image display layer including a part of the hologram and/or diffraction grating and displaying an image including at least a piece of the personal information.

According to a fourth aspect of the present invention, there is provided a method of manufacturing an individual authentication medium, comprising forming an image display comprising a base layer and an image display layer and displaying an image including personal information, wherein the formation of the image display includes transferring a part of a transfer material layer including a hologram and/or diffraction grating onto the base layer releasably supported by a support by a thermal transfer method using a thermal head so as to form the image display layer on the base layer, the image display layer including a part of the hologram and/or diffraction grating and displaying the image including at least a piece of the personal information, and transferring the image display from the support onto a substrate of the individual authentication medium.

BRIEF DESCRIPTION OF THE SEVERAL VIEWS OF THE DRAWING

FIG. 11 is a plan view schematically showing an individual authentication medium according to a second embodiment of the present invention;

FIG. 12 is a cross sectional view taken along the line XII-XII of the individual authentication medium shown in FIG. 11;

FIG. 20 is an enlarged cross sectional view schematically showing another part of the individual authentication medium according to the modified example; and FIG. 21 is an enlarged view schematically showing the arrangement of the diffraction image-displaying layer and the ink image-displaying layer formed in Example 3.

DETAILED DESCRIPTION OF THE INVENTION

Figure 1:
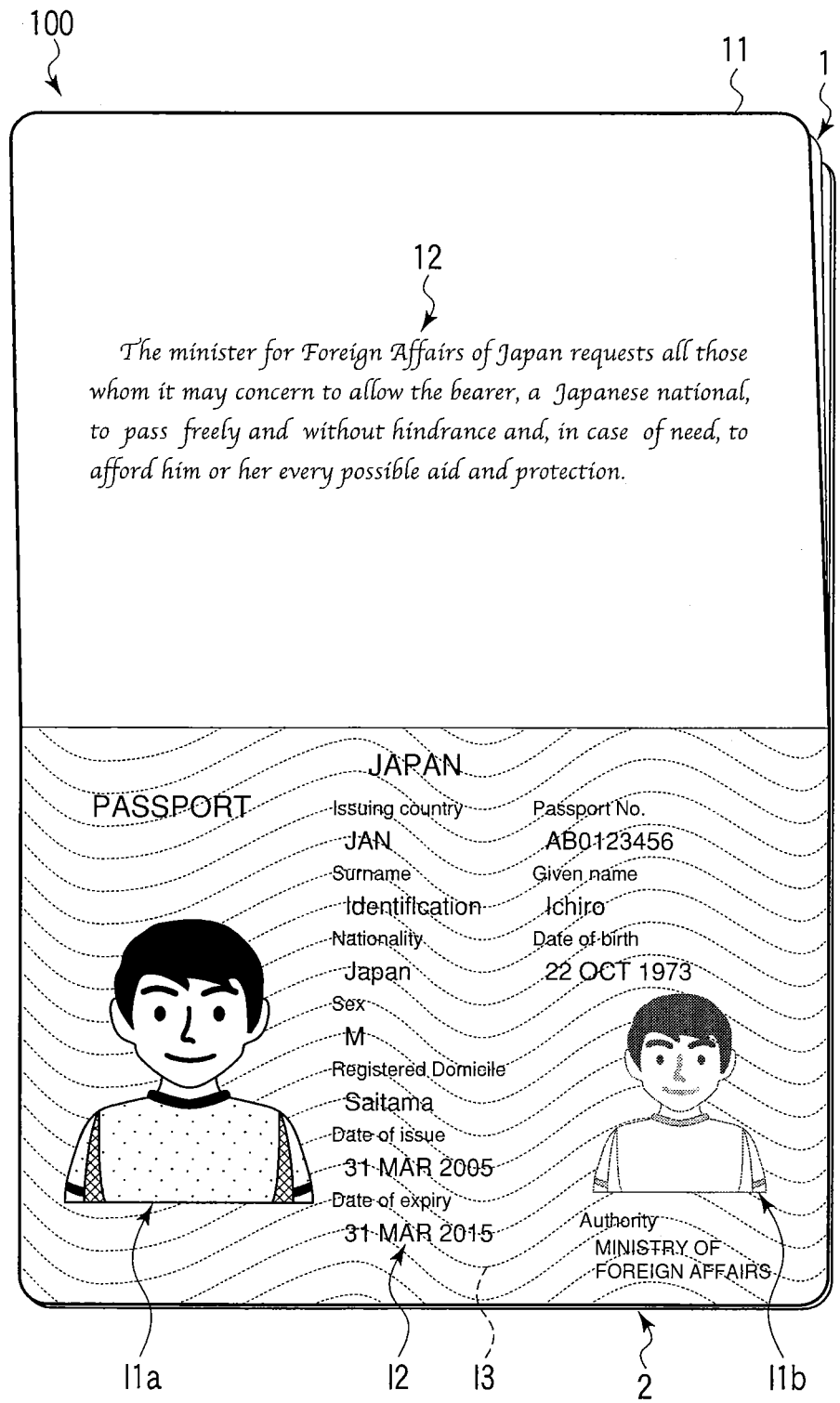
FIG. 1 is a plan view schematically showing an individual authentication medium according to a first embodiment of the present invention.

Embodiments of the present invention will be hereinafter described in detail with reference to drawings. It should be noted that constituent elements achieving the same or similar functions are denoted with the same reference numerals throughout the drawings, and redundant explanation thereof is omitted.

First Embodiment

The first embodiment relates to, for example, the following techniques.

(1) An image display that is to be transferred from a support onto a substrate of an individual authentication medium and displays an image including personal information, comprising a base layer releasably supported by the support and having a light-transmitting property, and a first image display layer including a hologram and/or diffraction grating and transferred onto the base layer by a thermal transfer method using a thermal head, the first image display layer displaying a first image including at least a piece of the personal information.

(2) The image display according to the item (2), further comprising a second image display layer facing the base layer and displaying a second image by utilizing light absorption.

(3) The image display according to the item (2), wherein the first image includes a piece of the personal information, while the second image includes another piece of the personal information.

(4) The image display according to the item (2), wherein the first image includes first personal information, the second image includes second personal information, and the first and second personal information are information of the same person.

(5) The image display according to the item (4), wherein at least one of the first and second images includes biometric information.

(6) The image display according to the item (4), wherein the first and second images include the same facial image.

(7) The image display according to any one of the items (1) to (6), wherein the first image display layer includes dot-shaped portions, and each center of the dot-shaped portions is located on a lattice point of a virtual planar lattice.

(8) The image display according to any one of the items (1) to (7), further comprising an adhesive layer facing the base layer with the first image display layer interposed therebetween.

(9) An individual authentication medium comprising the image display according to any one of the items (1) to (8), and the substrate having the image display transferred from the support.

(10) A method of manufacturing an image display that is to be transferred from a support onto a substrate of an individual authentication medium and displays an image including personal information, comprising transferring a part of a transfer material layer including a hologram and/or diffraction grating onto the base layer releasably supported by the support by a thermal transfer method using a thermal head so as to form an image display layer on the base layer, the image display layer including a part of the hologram and/or diffraction grating and displaying an image including at least a piece of the personal information.

(11) A method of manufacturing an individual authentication medium, comprising forming an image display comprising a base layer and an image display layer and displaying an image including personal information, wherein the formation of the image display includes transferring a part of a transfer material layer including a hologram and/or diffraction grating onto the base layer releasably supported by a support by a thermal transfer method using a thermal head so as to form the image display layer on the base layer, the image display layer including a part of the hologram and/or diffraction grating and displaying the image including at least a piece of the personal information, and transferring the image display from the support onto a substrate of the individual authentication medium.

The effects of the techniques according to the items (1) to (11) will be individually described.

The image display according to the item (1) is to be transferred from a support onto a substrate of an individual authentication medium and comprises a base layer releasably supported by the support and having a light-transmitting property, and a first image display layer including a hologram and/or diffraction grating and transferred onto the base layer by a thermal transfer method using a thermal head. In the case of directly forming the first image display layer on the substrate of the individual authentication medium by a thermal transfer method using a thermal head, a high image quality is difficult to achieve due to the surface roughness of the substrate, etc. By contrast, in the image display, the first image display layer is formed not on the substrate of the individual authentication medium but on the base layer. Then, the first image display layer is transferred onto the substrate of the individual authentication medium together with the base layer. Thus, the surface roughness of the substrate, etc. does not have a great influence on the image quality. Therefore, when using the image display, an individual authentication medium that displays a high quality image can be obtained.

The image display according to the item (1) displays a piece of the personal information using the hologram and/or diffraction grating. It is extremely difficult to tamper with the personal information displayed by the hologram and/or diffraction grating. In addition, the image display is adhered to the substrate of the individual authentication medium by the thermal transfer method. The image display thus adhered to the substrate of the individual authentication medium is readily broken when peeled off from the substrate. Thus, when using the image display, an individual authentication medium that is hard to tamper with information thereon can be obtained.

The image display according to the item (2) further comprises a second image display layer facing the base layer and displaying a second image by utilizing light absorption. The second image is excellent in visibility as compared with the first image. Thus, when the first and second image display layers are used in combination, the image display can display an image that is hard to forge and an image with high visibility. Therefore, in this case, the number of images to be displayed by the substrate of the individual authentication medium can be reduced, and forgery of the image display can be made more difficult.

In the image display according to the item (3), the first image includes a piece of the personal information, while the second image includes another piece of the personal information. Forgery of this image display is more difficult than that of the image display in which only the first image includes the personal information.

In the image display according to the item (4), the first image includes first personal information, the second image includes second personal information, and the first and second personal information are information of the same person. In this case, forgery of the image display can be made more difficult, and individual authentication can be performed more reliably.

In the image display according to the item (5), at least one of the first and second images includes biometric information. The biometric information is of great usefulness in the individual authentication because it is unique to the individual.

In the image display according to the item (6), the first and second images include the same facial image. A facial image is commonly used as biometric information and suitable for individual authentication by a visual check.

In the image display according to item (7), the first image display layer includes dot-shaped portions, and each center of the dot-shaped portions is located on a lattice point of a virtual planar lattice. In general, this structure is obtained in the case of utilizing a thermal transfer using a thermal head.

The image display according to the item (8) further comprises an adhesive layer facing the base layer with the first image display layer interposed therebetween. The adhesive layer strongly adheres the image display to the substrate when transferring the image display from the support onto the substrate of the individual authentication medium. In addition, the adhesive layer makes it difficult to replicate the hologram and/or diffraction grating.

The individual authentication medium according to the item (9) comprises the image display according to any one of the items (1) to (8), and the substrate having the image display transferred from the support. Therefore, the individual authentication medium displays a high quality image and the information thereon is hard to tamper with.

The method of manufacturing an image display according to the item (10) is a method of manufacturing an image display that is to be transferred from a support onto a substrate of an individual authentication medium and displays an image including personal information. In this method, a part of a transfer material layer including a hologram and/or diffraction grating is transferred onto the base layer releasably supported by the support by a thermal transfer method using a thermal head so as to form an image display layer on the base layer, the image display layer including a part of the hologram and/or diffraction grating and displaying an image including at least a piece of the personal information. According to this method, an image display that displays a high quality image can be obtained. Therefore, when using this image display thus obtained, an individual authentication medium that displays a high quality image can be obtained. Further, the information on the individual authentication medium including the image display thus obtained is hard to tamper with.

The method of manufacturing an individual authentication medium according to the item (11) comprises forming an image display that comprises a base layer and an image display layer and displays an image including personal information. In this formation, a part of a transfer material layer including a hologram and/or diffraction grating is transferred onto the base layer releasably supported by a support by a thermal transfer method using a thermal head so as to form the image display layer on the base layer, the image display layer including a part of the hologram and/or diffraction grating and displaying the image including at least a piece of the personal information. This manufacturing method further comprises transferring the image display from the support onto a substrate of the individual authentication medium. In this method, the surface roughness of the substrate, etc. does not have a great influence on the image quality. Therefore, according to this method, an individual authentication medium that displays a high quality image can be obtained. In the individual authentication medium thus obtained, the image display adhered to the substrate is readily broken when peeled off from the substrate. Thus, the individual authentication medium obtained by this method is hard to tamper with information thereon.

Subsequently, the first embodiment will be described with reference to drawings.

FIG. 1 is a plan view schematically showing an individual authentication medium according to the first embodiment of the present invention.

The individual authentication medium 100 shown in FIG. 1 is a booklet such as a passport. FIG. 1 depicts a booklet when the booklet is open.

This individual authentication medium 100 includes a cahier 1 and a cover sheet 2.

The cahier 1 includes one or more paper slips 11. Typically, print patterns 12 such as character strings and ground tints are provided on the paper slips 11. The cahier 1 is formed by folding, in two, a paper slip 11 or a bundle of a plurality of paper slips 11. The paper slip 11 may include, e.g., an integrated circuit (IC) chip on which personal information is to be recorded and an antenna which allows communication with the IC chip in a noncontacting manner.

The cover sheet 2 is folded in two. The cover sheet 2 and the cahier 1 are laid such that the cahier 1 is sandwiched by the cover sheet 2 when the booklet is closed. The cover sheet 2 and the cahier 1 are integrated by, e.g., binding them together at positions of creases thereof.

The cover sheet 2 displays an image including personal information. This personal information includes individual authentication information used for individual authentication. This personal information can be classified into, for example, biometric information and non-biometric personal information.

The biometric information is one of features of a living body that is unique to the individual. Typically, the biometric information is a feature that can be distinguished by an optical method. For example, the biometric information is at least one image or pattern of a face, a fingerprint, an iris and a vein.

The non-biometric personal information is personal information other than the biometric information. The non-biometric personal information is, for example, at least one of name, birth date, age, blood type, gender, nationality, address, domicile of origin, phone number, affiliation, and status. The non-biometric personal information may contain the characters entered by typewriting, may contain characters that are entered by mechanically-reading a hand-written characters such as a signature, or may contain both of them.

In FIG. 1, the cover sheet 2 displays images I1a, I1b, I2 and I3.

The images I1a, I2 and I3 are images displayed by utilizing light absorption. Specifically, the images I1a, I2 and I3 are images that can be visually recognized when illuminated with white light and observed with unaided eyes. One or more of the images I1a, I2 and I3 may be omitted.

The images I1a, I2 and I3 can be made with, for example, dye or pigment. In this case, the images I1a, I2 and I3 can be formed by a thermal transfer recording method using a thermal head, an ink jet recording method, an electrophotographic method, or a combination of two or more of them. Alternatively, the images I1a, I2 and I3 can be formed by forming a layer including a heat-sensitive color-producing agent and drawing on this layer with laser beam. Alternatively, a combination of these methods may be used. At least a part of the images I2 and I3 may be formed by a thermal transfer recording method using a hot stamp, may be formed by a printing method, or may be formed using a combination of them.

The image I1b is an image displayed by a hologram and/or diffraction grating. The image I1b is formed by, for example, performing a thermal transfer recording using a thermal head and a thermal transfer recording using a hot stamp or heat roll in this order.

The images I1a and I1b include facial images of the same person. The facial image included in the image I1a and the facial image included in the image I1b may be the same or may be different. The facial image included in the image I1a and the facial image included in the image I1b may be of the same size or may be of different sizes. Alternatively, each of the images I1a and I1b may include other biometric information instead of the facial image, or may further include biometric information other than the facial image in addition to the facial image.

The image I1b may include non-biometric personal information instead of the biometric information, or may further include non-biometric personal information in addition to the biometric information. The image I1b may include non-personal information instead of the personal information, or may further include non-personal information in addition to the personal information.

The image I2 includes non-biometric personal information and non-personal information. The image I2 constitutes, for example, one or more of characters, symbols, signs, and marks.

The image I3 is ground tints. When combining, for example, the image I3 with at least one of the images I1a and I1b, tampering of the information on the individual authentication medium 100 can be made more difficult.

Subsequently, the structure of the cover sheet 2 will be described with reference to FIGS. 2 to 5.

Figure 2:
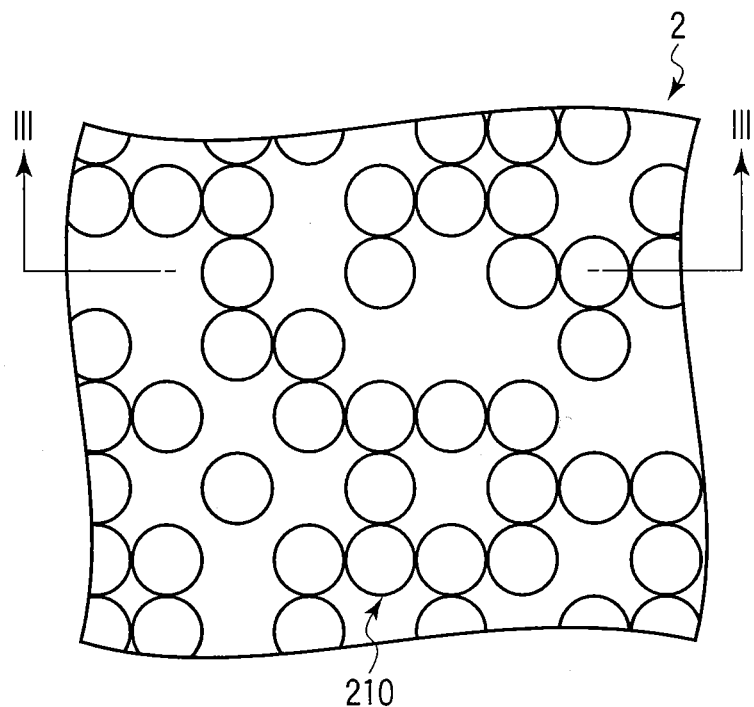
FIG. 2 is an enlarged plan view showing a part of the individual authentication medium shown in FIG. 1.
Figure 3:
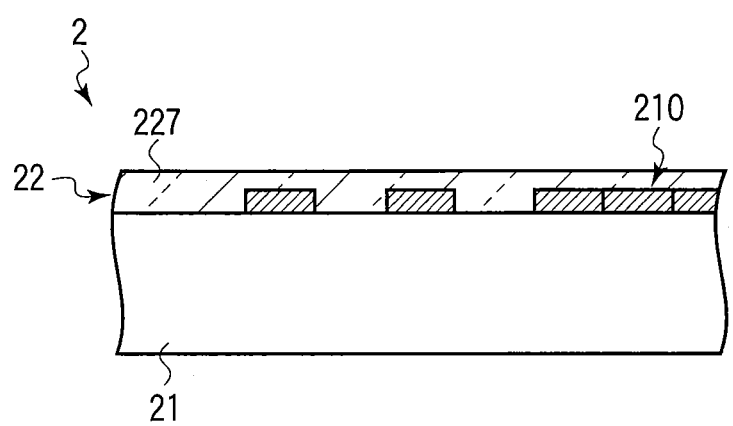
FIG. 3 is a cross sectional view taken along the line of the individual authentication medium shown in FIG. 2.
Figure 4:
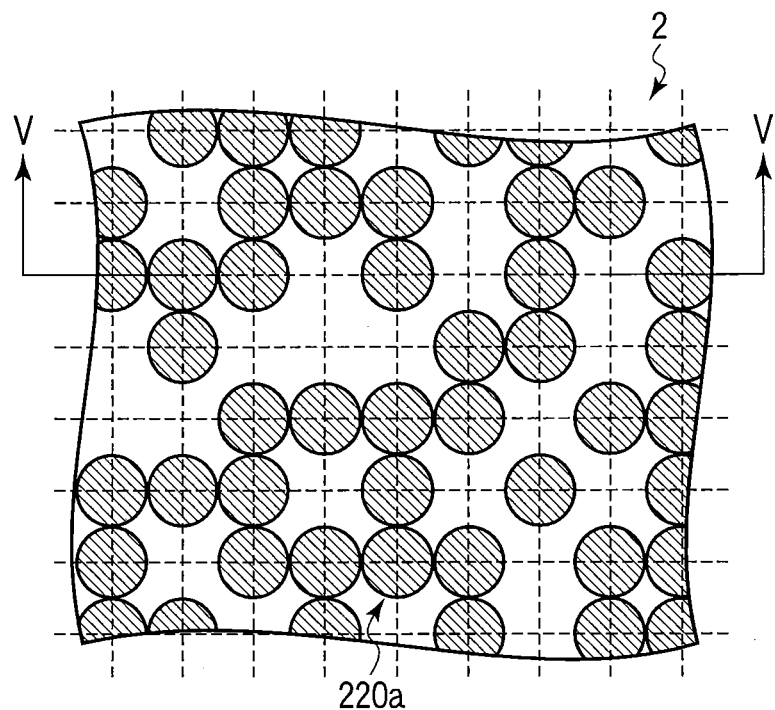
FIG. 4 is an enlarged plan view showing another part of the individual authentication medium shown in FIG. 1.
Figure 5:
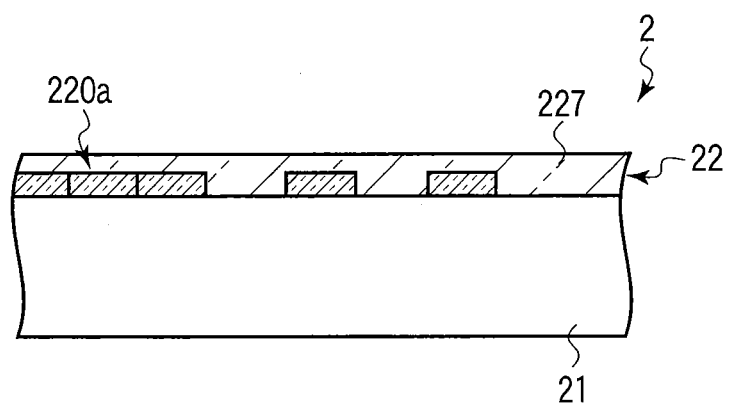
FIG. 5 is a cross sectional view taken along the line V-V of the individual authentication medium shown in FIG. 2.

FIG. 2 is an enlarged plan view showing a part of the individual authentication medium shown in FIG. 1. FIG. 3 is a cross sectional view taken along the line of the individual authentication medium shown in FIG. 2. FIG. 4 is an enlarged plan view showing another part of the individual authentication medium shown in FIG. 1. FIG. 5 is a cross sectional view taken along the line V-V of the individual authentication medium shown in FIG. 2.

The structure shown in FIGS. 2 and 3 is the part of the cover sheet 2 that corresponds to the image I1a. On the other hand, the structure shown in FIGS. 4 and 5 is the part of the cover sheet 2 that corresponds to the image I1b.

As shown in FIGS. 3 and 5, the cover sheet 2 includes a cover sheet main body 21 and an image display 22.

The cover sheet main body 21 is a substrate of the individual authentication medium 100, typically a paper slip. The cover sheet main body 21 may have a single-layer structure, or may have a multilayer structure. The cover sheet main body 21 is folded in two so as to sandwich the cahier 1 when the individual authentication medium 100 is closed.

The image display 22 is a layer having a multilayer structure. The image display 22 is adhered to one of the main surfaces of the cover sheet main body 21 that faces the cahier 1 when the individual authentication medium 100 is closed.

The image display 22 includes image display layers 210 and 220a and a protective release layer 227.

The image display layer 210 utilizes light absorption for displaying the image I1a. The image display layer 210 has a patterned shape corresponding to the image I1a as shown in FIGS. 2 and 3. The image display layer 210 can be made with at least one of dye and pigment and optionally resin. The image display layer 210 can be obtained by, for example, a thermal transfer recording method using a thermal head, an ink jet recording method, an electrophotographic method, or a combination of two or more of them.

The image display layer 210 may not be patterned. That is, the image display layer 210 may be a continuous film. In this case, the image display layer 210 can be obtained by, for example, forming a layer containing a heat-sensitive color-producing agent and drawing on this layer with laser beam.

The image display layer 220a includes a hologram and/or diffraction grating. The image display layer 220a has a patterned shape corresponding to the image I1b as shown in FIGS. 4 and 5. The structure and method of forming the image display layer 220a will be described later.

The protective release layer 227 covers the image display layers 210a and 220a and the cover sheet main body 21. The protective release layer 227 has a light-transmitting property and is typically transparent. The protective release layer 227 is made of, for example, resin.

The portion of the cover sheet 2 that corresponds to the image I2 can employ, for example, almost the same structure as that described for the portion of the cover sheet 2 that corresponds to the image I1a except that the images to be displayed are different. The portion of the cover sheet 2 that corresponds to the image I1a and the portion of the cover sheet 2 that corresponds to the image 12 may have the same layered structure or different layered structures.

The method of manufacturing the individual authentication medium 100 and the structure of the image display layer 220a will be described with reference to FIGS. 6 to 8.

Figure 6:
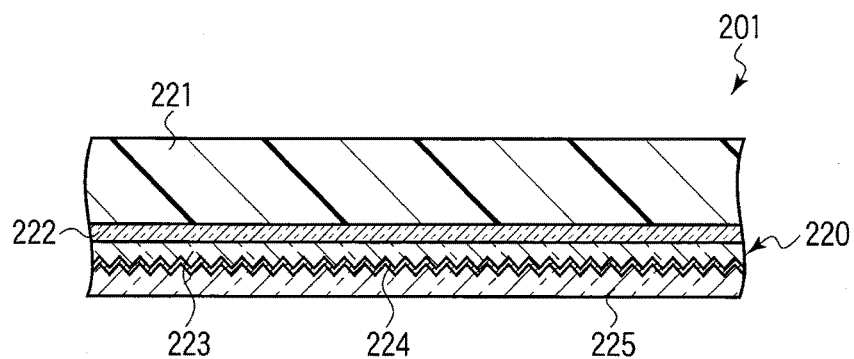
FIG. 6 is a cross sectional view schematically showing an example of a primary transfer foil that can be used for manufacturing the individual authentication medium shown in FIGS. 1 to 5.

FIG. 6 is a cross sectional view schematically showing an example of a primary transfer foil that can be used for manufacturing the individual authentication medium shown in FIGS. 1 to 5. FIG. 7 is a cross sectional view schematically showing an example of a secondary transfer foil that can be manufactured using the primary transfer foil shown in FIG. 6. FIG. 8 is a cross sectional view schematically showing an example of a used primary transfer foil.

The transfer foil 201 shown in FIG. 6 is, for example, a transfer ribbon. The transfer foil 201 includes a support body 221 and a transfer material layer 220 releasably supported by the support body 221.

The support body 221 is, for example, a resin film or sheet. The support body 221 is made of, for example, a material excellent in heat-resistant property such as polyethylene terephthalate. As the support body 221, for example, a film or sheet made of plastics such as polypropylene (PP), polycarbonate (PC), polymethylmethacrylate (PMMA) and polyethylene (PE) may be used. A release layer including, for example, fluorocarbon resin or silicone resin may be provided on the main surface of the support body 221 that support the transfer material layer 220. The support body 221 preferably has a thickness of about 10 μm to about 100 μm.

The transfer material layer 220 includes a release layer 222, a diffraction structure formation layer 223, a reflection layer 224, and an adhesive layer 225.

The release layer 222 is formed on the support body 221. The release layer 222 plays a role of stabilizing the release of the transfer material layer 220 from the support body 221 as well as a role of promoting the adhesion of the image display layer 220a to the cover sheet main body 21. The release layer 222 has a light-transmitting property, and is transparent in a typical case. The release layer 222 may be omitted.

The release layer is made of, for example, thermoplastic resin.

As the material of the release layer 222, for example, preferably used is a thermoplastic resin such as polycarbonate resin, acrylic resin, fluorinated acrylic resin, silicone acrylic resin, epoxy acrylate resin, polystyrene resin, cycloolefin polymer, methylstyrene resin, fluorene resin, polyethylene terephthalate (PET), polypropylene, polyethylene terephthalate resin and polyacetal resin added with a silicone-based additive or fluorocarbon additive. As the material of the release layer 222, a material that can easily released from the support body 221 such as fluorinated acrylic resin and silicone acrylic resin may also be used.

The relief structure formation layer 223 is formed on the release layer 222. The relief structure formation layer 223 includes at least one of hologram and diffraction grating as the diffraction structure. Here, the relief structure formation layer 223 is a transparent layer having a surface provided with a relief structure as the diffraction structure.

The material of the transparent layer is, for example, a resin such as photo-curable resin, thermosetting resin, and thermoplastic resin. The photo-curable resin is, for example, polycarbonate resin, acrylic resin, fluorocarbon resin, silicone acrylic resin, epoxy acrylate resin, polystyrene resin, cycloolefin polymer, methylstyrene resin, fluorene resin, PET, or polypropylene. The thermosetting resin is, for example, styrene-acrylonitrile copolymer resin, phenol resin, melamine resin, urea resin, or alkyd resin. The thermoplastic resin is, for example, polypropylene resin, polyethylene terephthalate resin, or polyacetal resin. The hardened materials of these resins have a light-transmitting property, and the refractive indices thereof are generally about 1.5.

The diffraction structure formation layer 223 is formed by, for example, the following method. First, a film made of the above-described resin is provided on a main surface of the light-transmitting substrate 14, and a mold provided with a relief structure is pressed against the film. The film is then hardened in this state. Thereafter, the mold is removed from the film to obtain the diffraction structure formation layer 223.

The diffraction structure formation layer 223 may be a three-dimensional hologram. A directional scattering structure may be provided in addition to or instead of the diffraction structure formation layer 223.

The reflection layer 224 is formed on the diffraction structure formation layer 223. Although the reflection layer 224 may be omitted, the visibility of the image produced by the diffraction structure improves when the reflection layer 224 is provided.

The reflection layer 224 may be, for example, a transparent reflection layer or an opaque metal reflection layer. The reflection layer 224 can be formed by, for example, vacuum deposition method such as vacuum evaporation and sputtering.

The transparent reflection layer may be, for example, a layer made of a transparent material whose refractive index is different from that of the diffraction structure formation layer 223. The transparent reflection layer made of a transparent material may have a single-layer structure or a multilayer structure. In the latter case, the transparent reflection layer may be designed to cause multiple-beam interference. As the transparent material, for example, transparent dielectrics such as zinc sulfide and titanium dioxide can be used.

Alternatively, the transparent reflection layer may be a metal layer whose thickness is less than 20 nm. The material of the metal layer is, for example, an elemental metal such as chromium, nickel, cobalt, aluminum, iron, titanium, silver, gold, and copper, or an alloy of the above metals.

As the opaque metal reflection layer, the same metal layer as that described for the transparent reflection layer can be used except that the thickness is larger.

The adhesive layer 225 is formed on the reflection layer 224. The adhesive layer 225 is made of, for example, thermoplastic resin. As the thermoplastic resin, for example, polypropylene resin, polyethylene terephthalate resin, polyacetal resin, or polyester resin can be used. The adhesive layer 225 may be omitted.

For manufacturing the individual authentication medium 100, for example, a facial image of a person is taken with an imaging device. Alternatively, a facial image is read from a photographic print. Thus, an image data is obtained as an electric data. The facial image is subjected to image-processing, if necessary.

Figure 7:
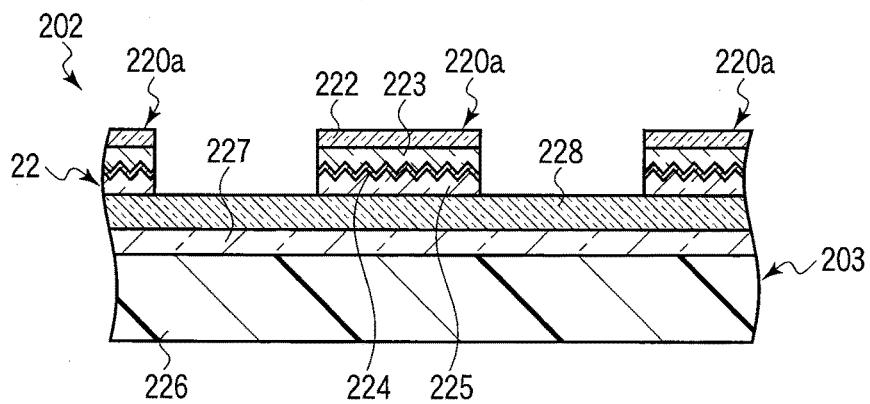
FIG. 7 is a cross sectional view schematically showing an example of a secondary transfer foil that can be manufactured using the primary transfer foil shown in FIG. 6.

Subsequently, the laminated body 203 shown in FIG. 7 is prepared. This laminated body 203 is a layer having a multilayer structure, and includes a support body 226 and also includes a protective release layer 227 and a resin layer 228 formed thereon in this order. The multilayer structure formed on the support body 226 constitutes an underlayer. The support body 226 releasably supports this underlayer.

The support body 226 may be, for example, those mentioned for the support body 221.

The protective release layer 227 plays a role of stabilizing the release of the transfer material layer 220, which includes the protective release layer 227 and the image display layer 220a, from the support body 226 and a role of protecting the image display layer 220a from being damaged. The protective release layer 227 may be, for example, those mentioned for the release layer 222. When the resin layer 228 has a function of a release layer, the protective release layer 227 can be omitted.

The resin layer 228 has a light-transmitting property, and is transparent in a typical case. The resin layer 228 plays a role of giving sufficient strength to the above underlayer. The material of the resin layer 228 may be, for example, thermosetting resin, photo-curable resin, or thermoplastic resin. When a thermosetting resin is used, this resin layer 228 can be used as an adhesive layer for bonding the image display 22 to the cover sheet main body 21.

The resin layer 228 may include at least one of hologram and diffraction grating as a diffraction structure. For example, a relief structure may be provided as a diffraction structure on the surface of the resin layer 228. In this case, the image displayed by this diffraction structure and the image I1b displayed by the image display layer 220b are superposed on each other or arranged side by side.

The laminated body 203 may further include a patterned metal reflection layer such as an opaque metal reflection layer. For example, a patterned metal reflection layer may be provided on the resin layer 228 or between the protective release layer 227 and the resin layer 228, and dots, line screen, other figures, or a combination thereof may be displayed by this metal reflection layer. Such pattern can be used for, for example, the authenticity check of the image display 22 or the individual authentication medium 100.

Subsequently, the image display layer 220a having the pattern corresponding to the above facial image is formed on the laminated body 203. More specifically, based on the above image data, a part of the transfer material layer 220 is thermally transferred from the support body 221 shown in FIG. 6 onto the resin layer 228 shown in FIG. 7 as the image display layer 220a. This thermal transfer is performed using a thermal head in such a manner that a part of the transfer material layer 220 thermally transferred onto the resin layer 228 has the pattern corresponding to the above facial image. As a result, the transfer foil 202 including the support body 226, the protective release layer 227, the resin layer 228, and the image display layer 220a is obtained. The transfer foil 202 is, for example, a transfer ribbon.

Since thermal transfer using a thermal head is utilized to obtain the image display layer 220a, the image display layer 220a typically includes a plurality of dot-shaped portions shown in FIGS. 4 and 5. The center of each of these dot-shaped portions is located on a lattice point of a virtual planar lattice indicated by broken lines in FIG. 4.

In FIG. 4, the above planar lattice is a square lattice. However, the planar lattice may be other lattice such as triangular lattice and rectangular lattice. In FIG. 4, dot-shaped portions juxtaposed to each other are arranged such that the outlines thereof are in contact with each other at one point. In other words the diameter of each dot-shaped portion is equal to the minimum center-to-center distance of the dot-shaped portions. The adjacent dot-shaped portions may be placed away from each other. In other words, the diameter of each dot-shaped portion may be smaller than the minimum center-to-center distance of the dot-shaped portions. Alternatively, the adjacent dot-shaped portions may be arranged as if they partially overlap each other. In other words, the diameter of each dot-shaped portion may be larger than the minimum center-to-center distance of the dot-shaped portions.

The diameter of the dot-shaped portion or the minimum center-to-center distance of the dot-shaped portions is within a range of, for example, 0.085 to 0.508 mm (about 300 to about 50 dots per inch). When the facial image is displayed by the image display layer 220a, the diameter of the dot-shaped portion or the minimum center-to-center distance of the dot-shaped portions is within a range of, for example, 0.085 to 0.169 mm (about 300 to about 150 dots per inch). When this size is increased, it is difficult to display a high-resolution image on the image display layer 220. When this size is reduced, the reproducibility of the patterned shape of the image display layer 220 decreases.

Figure 8:
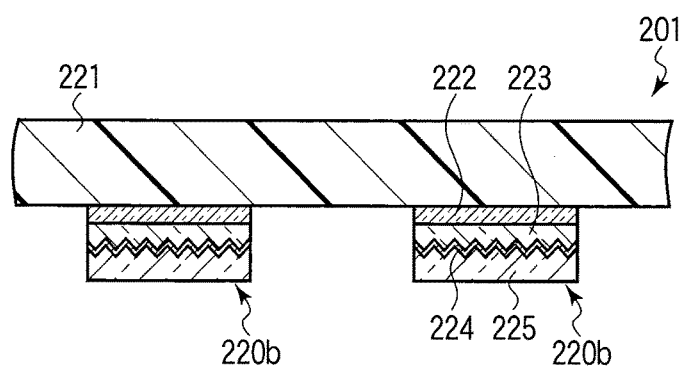
FIG. 8 is a cross sectional view schematically showing an example of a used primary transfer foil.

As shown in FIG. 8, in the used primary transfer foil 201, a part 220b of the transfer material layer 220 remains as a negative pattern of the image display layer 220a. This negative pattern can be used to check up the image display layer 220a.

In addition to forming the image display layer 220a on the protective release layer 227 using a part of the primary transfer foil 201, a pattern indicating the non-biometric personal information and history information such as date and time at which the image display layer 220b are formed may be thermally transferred onto a separately-prepared substrate using another part of the primary transfer foil 201. As a result, the used primary transfer foil 201 can be utilized not only for checkup of the image display layer 220a but also for checkup of other information.

Before the image display layer 220a is formed, another layer may be formed on the resin layer 228 or between the protective release layer 227 and the resin layer 228. For example, on the resin layer 228 or between the protective release layer 227 and the resin layer 228, a reflection layer, hologram and/or diffraction grating, or both of them may be formed.

This reflection layer may be a continuous film, or may be patterned. In the latter case, the pattern of the reflection layer may be dots, line screens, figures, or a combination thereof. This reflection layer may have a light-transmitting property, or may be opaque. Typically, this hologram and/or diffraction grating has optical characteristics different from those of the hologram and/or diffraction grating included in the diffraction structure formation layer 223.

The image display layer 210 shown in FIGS. 2 and 3 is further formed on the resin layer 228 or between the protective release layer 227 and the resin layer 228. When the image display layer 210 is formed on the resin layer 228, the image display layer 210 may be formed before the image display layer 220a is formed on the resin layer 228, or may be formed on the resin layer 228 after the image display layer 220a is formed on the resin layer 228.

When the image display layer 210 is formed by thermal transfer method, sublimation transfer method or hot-melt transfer method may be employed.

Alternatively, both of them may be employed. The image displayed by the image display layer 210 may be a monochrome image or a color image. In the latter case, the image display layer 210 can be obtained by, for example, using one or more ink ribbons to form colored layers in four colors, i.e., yellow, magenta, cyan, and black, or form colored layers in three colors, i.e., red, green, and blue.

A layer (not shown) displaying the image 13 shown in FIG. 1 may be further formed on the resin layer 228 or between the protective release layer 227 and the resin layer

228. When the layer displaying the image 13 is formed on the resin layer 228, this layer may be formed before the image display layer 220*a* is formed on the resin layer 228, or may be formed after the image display layer 220*a* is formed on the resin layer 228. Alternatively, the layer displaying the image 13 may be formed on the cover sheet main body 21 instead of forming it on the resin layer 228 or between the protective release layer 227 and the resin layer 228. The layer displaying the image 13 may be formed by, for example, the same method as that described for the image display layer 210.

Subsequently, a part of the transfer material layer formed on the support body 226 that is used as the image display 22 is thermally transferred from the support body 226 onto the cover sheet main body 21 shown in FIGS. 3 and 5. This thermal transfer uses, for example, hot stamp. Instead of thermal transfer using the hot stamp, thermal transfer may be performed using a heat roll or thermal head. As described above, the image display 22 is adhered to the cover sheet main body 21.

The layer displaying the image 13 may be formed on the cover sheet main body 21 as described above. An adhesive anchor layer may be formed on the cover sheet main body 21 in order to enhance the adhesion strength.

Figure 9:
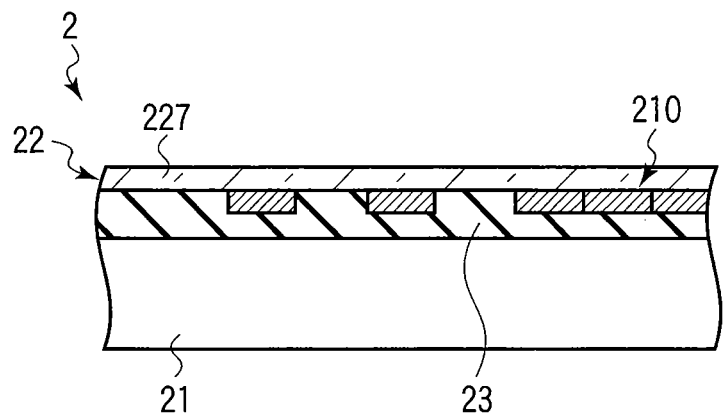
FIG. 9 is an enlarged cross sectional view schematically showing a part of an individual authentication medium according to a modified example.
Figure 10:
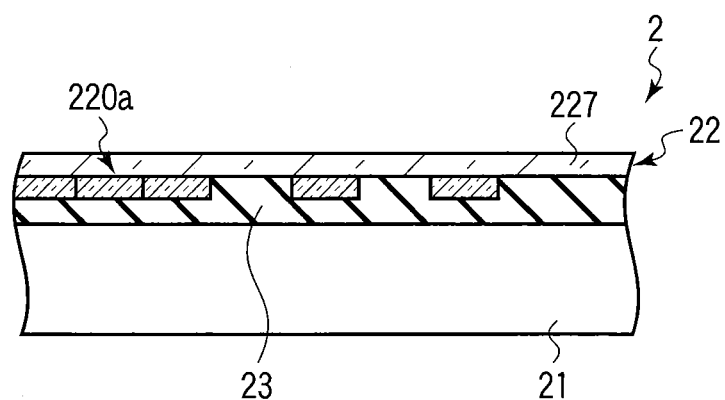
FIG. 10 is an enlarged cross sectional view schematically showing another part of the individual authentication medium according to the modified example.

When it is difficult to bond the image display 22 to the cover sheet main body 21 with high adhesion strength, the portion of the transfer material layer used as the image display 22 may be thermally transferred onto the cover sheet main body 21 via an adhesive layer. For example, an adhesion ribbon may be used. When using this, the adhesion strength between the image display 22 and the cover sheet main body 21 can be enhanced. According to this method, the structure in which the adhesive layer 23 is interposed between the image display 22 and the cover sheet main body 21 can be obtained as shown in FIGS. 9 and 10.

When it is difficult to bond the image display 22 to the cover sheet main body 21 with high adhesion strength, and the image display layer 210 is formed after the image display layer 220*a* is formed, an ink ribbon additionally having a function of an adhesion ribbon may be used. In this case, it is not necessary to use an adhesion ribbon in addition to the ink ribbon.

After the image display 22 is thermally transferred onto the cover sheet main body 21 as described above, necessary steps are appropriately carried out. In this manner, the individual authentication medium 100 described with reference to FIGS. 1 to 5 is obtained.

In this method, thermal transfer using a thermal head is utilized to form the image display layer 220*a*. The precision that can be achieved with use of a thermal head is higher than the precision that can be achieved by printing of pearl pigment.

When the image display layer 220*a* is directly formed on the cover sheet main body 21 by thermal transfer using a thermal head, it is difficult to achieve high image quality due to roughness of the surface of the cover sheet main body 21. In contrast, in the above method, the image display layer 220*a* is not directly formed on the cover sheet main body 21. In other words, in this method, first, the image display layer 220*a* is formed on the protective release layer 227, and thereafter, transferred onto the cover sheet main body 21 together with the protective release layer 227. Therefore, the image quality is not greatly affected by the surface roughness of the cover sheet main body 21 and the like.

Therefore, according to this method, high quality image can be displayed by the image display layer 220*a*.

This image display 22 displays a piece of personal information using the hologram and/or diffraction grating. It is extremely difficult to tamper with the personal information, in particular biometric information, displayed by the hologram and/or the diffraction grating.

In this method, the image display 22 is supported by the cover sheet main body 21 by thermal transfer. Such image display 22 is easily destroyed when it is released from the cover sheet main body 21.

Therefore, it is difficult to tamper with information on this individual authentication medium 100.

Second Embodiment

The second embodiment of the present embodiment will be described.

The second embodiment relates to, for example, the following techniques.

(1) An image display that is to be transferred from a support onto a substrate of an individual authentication medium and displays an image including personal information, comprising a base layer releasably supported by the support and having a light-transmitting property, and a first image display layer including a hologram and/or diffraction grating and an ink layer and transferred onto the base layer by a thermal transfer method using a thermal head, the first image display layer displaying a first image including at least a piece of the personal information.

(2) The image display according to the item (1), further comprising a second image display layer facing the base layer and displaying a second image by utilizing light absorption.

(3) The image display according to the item (2), wherein the first image includes a piece of the personal information, while the second image includes another piece of the personal information.

(4) The image display according to item (2), wherein the first image includes first personal information, the second image includes second personal information, and the first and second personal information are information of the same person.

(5) The image display according to the item (4), wherein at least one of the first and second images includes biometric information.

(6) The image display according to the item (4), wherein the first and second images include the same facial image.

(7) The image display according to any one of the items (1) to (6), wherein the first image display layer includes dot-shaped portions, and each center of the dot-shaped portions is located on a lattice point of a virtual planar lattice.

(8) The image display according to any one of the items (1) to (7), wherein the ink layer is configured to display an outer frame of a pattern displayed by the dot-shaped portions of the first image layer, a contour of the pattern, or both the outer frame and the contour.

(9) The image display according to any one of the items (1) to (8), wherein the ink layer is made of a color ink.

(10) The image display according to any one of the items (1) to (9), wherein a color of the color ink and a color of the substrate are complementary colors.

(11) The image display according to any one of the items (1) to (10), further comprising an adhesive layer facing the base layer with the first image display layer interposed therebetween.

(12) An individual authentication medium comprising the image display according to any one of the items (1) to (11), and the substrate having the image display transferred from the support.

(13) A method of manufacturing an image display that is to be transferred from a support onto a substrate of an individual authentication medium and displays an image including personal information, comprising transferring a part of a transfer material layer including a hologram and/or diffraction grating and an ink layer onto the base layer releasably supported by the support by a thermal transfer method using a thermal head so as to form an image display layer on the base layer, the image display layer including a part of the hologram and/or diffraction grating and a part of the ink layer and displaying an image including at least a piece of the personal information.

(14) A method of manufacturing an individual authentication medium, comprising forming an image display comprising a base layer and an image display layer and displaying an image including personal information, wherein the formation of the image display includes transferring a part of a transfer material layer including a hologram and/or diffraction grating and an ink layer onto the base layer releasably supported by a support by a thermal transfer method using a thermal head so as to form the image display layer on the base layer, the image display layer including a part of the hologram and/or diffraction grating and a part of the ink layer and displaying the image including at least a piece of the personal information, and transferring the image display from the support onto a substrate of the individual authentication medium.

The effects of the techniques according to the items (1) to (14) will be individually described.

In the image display according to the item (1), the first image display layer is formed not on the substrate of the individual authentication medium but on the under layer and has a structure in which the ink layer is combined with the hologram or diffraction grating layer. When employing the structure in which the ink layer is combined with the hologram or diffraction grating layer, an image can be displayed with a sufficiently high degree of visibility even under an environment where the hologram or diffraction grating does not emit a diffracted light with a sufficiently high intensity. For example, in the case of displaying a facial image, the image can be displayed with a high degree of visibility when representing the eyes, hair, mouth, etc. by the ink layer in combination with the hologram or diffraction grating layer. Therefore, this image display offers an excellent performance in preventing forgery, tampering and alteration and an easy-to-detect performance that makes it possible to easily detect a fraudulent article by observation, etc. in the case where such a fraud is done.

The image display according to the item (2) can achieve a higher performance in preventing forgery, tampering and alteration because it has a more complicated structure. In addition, the image display can be easily discriminated from a forged, tampered or altered image display by observation, etc. In other words, in the case where this image display is a genuine article, a forged, tampered or altered image display can be easily detected by observation, etc. That is, a higher easy-to-detect performance can be achieved.

In the image display according to the item (3), the first image includes a piece of the personal information, while the second image includes another piece of the personal information. This image display can achieve a higher performance in preventing forgery, tampering and alteration as compared with the image display in which only the first image includes the personal information. In addition, this image display can achieve a higher easy-to-detect performance as compared with the image display in which only the first image includes the personal information.

In the image display according to the item (4), the first image includes first personal information, the second image includes second personal information, and the first and second personal information are information of the same person. In this case, forgery of the image display can be made more difficult, and individual authentication can be performed more reliably.

In the image display according to the item (5), at least one of the first and second images includes biometric information. The biometric information is of great usefulness in the individual authentication because it is unique to the individual.

In the image display according to the item (6), the first and second images include the same facial image. A facial image is commonly used as biometric information and suitable for individual authentication by a visual check. Further, the genuineness can be checked by visually comparing the two images.

In the image display according to item (7), the first image display layer includes dot-shaped portions, and each center of the dot-shaped portions is located on a lattice point of a virtual planar lattice. A complicated structure like this is advantageous in achieving a higher performance in preventing forgery, tampering and alteration. In addition, this structure is advantageous in representing a high definition image.

In the image display according to the item (8), the ink layer is configured to display an outer frame of a pattern displayed by the dot-shaped portions of the first image layer, a contour of the pattern, or both the outer frame and the contour. Here, "an outer frame of a pattern" means a frame that is spaced apart from the pattern such that the distance from the pattern is constant at any position on the inner periphery thereof. A complicated structure like this is advantageous in achieving a higher performance in preventing forgery, tampering and alteration. In addition, an image can be displayed with a sufficiently high degree of visibility even under an environment where the hologram or diffraction grating does not emit a diffracted light with a sufficiently high intensity. For example, in the case of displaying a facial image, the image can be displayed with a higher degree of visibility when the contours of the regions that are important for individual authentication such as a contour of face, eyes, hair and mouth are represented by the ink layer while the other regions are represented by the hologram or diffraction grating layer. Further, the visibility of the hologram can also be improved when the outer frame or contour of the ink layer is provided. Therefore, a higher easy-to-detect performance can be achieved.

In the image display according to the item (9), the ink layer is made of a color ink. An image display displaying a color image has a higher aesthetic value and can achieve a higher easy-to-detect performance and a higher performance in preventing forgery, tampering and alteration as compared with an image display displaying a monochrome image.

In the image display according to the item (10), a color of the color ink and a color of the substrate are complementary colors. In this case, the ink layer displays an image with a higher degree of visibility as compared with the other cases.

The image display according to the item (11) further comprises an adhesive layer facing the base layer with the first image display layer interposed therebetween. The adhesive layer strongly adheres the image display to the substrate when transferring the image display from the support onto the substrate of the individual authentication medium. In addition, the adhesive layer makes it difficult to replicate the hologram and/or diffraction grating.

The individual authentication medium according to the item (12) comprises the image display according to any one of the items (1) to (11). Therefore, the individual authentication medium displays a high quality image and the information thereon is hard to tamper with.

The method of manufacturing an image display according to the item (13) is a method of manufacturing an image display that is to be transferred from a support onto a substrate of an individual authentication medium and displays an image including personal information. In this method, apart of a transfer material layer including a hologram and/or diffraction grating and an ink layer is transferred onto the base layer releasably supported by the support by a thermal transfer method using a thermal head so as to form an image display layer on the base layer, the image display layer including a part of the hologram and/or diffraction grating and a part of the ink layer and displaying an image including at least a piece of the personal information. According to this method, an image display that displays a high quality image can be obtained. Therefore, when using this image display thus obtained, an individual authentication medium that displays a high quality image can be obtained. Further, the information on the individual authentication medium including the image display thus obtained is hard to tamper with.

The method of manufacturing an individual authentication medium according to the item (14) comprises forming an image display that comprises a base layer and an image display layer and displays an image including personal information. In this formation, a part of a transfer material layer including a hologram and/or diffraction grating and an ink layer is transferred onto the base layer releasably supported by a support by a thermal transfer method using a thermal head so as to form the image display layer on the base layer, the image display layer including a part of the hologram and/or diffraction grating and a part of the ink layer and displaying the image including at least a piece of the personal information. This manufacturing method further comprises transferring the image display from the support onto a substrate of the individual authentication medium. In this method, the surface roughness of the substrate, etc. does not have a great influence on the image quality. Therefore, according to this method, an individual authentication medium that displays a high quality image can be obtained. In the individual authentication medium thus obtained, the image display adhered to the substrate is readily broken when peeled off from the substrate. Thus, the individual authentication medium obtained by this method is hard to tamper with information thereon.

Subsequently, the second embodiment will be described with reference to drawings. The second embodiment is the same as the first embodiment except that the structure described below is employed.

FIG. 11 is a plan view schematically showing an individual authentication medium according to the second embodiment of the present invention. FIG. 12 is a cross sectional view taken along the line XII-XII of the individual authentication medium shown in FIG. 11.

The individual authentication medium according to the second embodiment is the same as the individual authentication medium 100 described with reference to FIGS. 1 to 5 except that the structure shown in FIGS. 11 and 12 is employed. That is, in the individual authentication medium according to the second embodiment, the image display 22 further includes an image display layer 230a.

The image display layer 230a is a ink image display layer made from an ink. The image display layer 230a is interposed between the cover sheet main body 21 and the protective release layer 227. The pattern displayed by the image display layer 230a constitutes the contour of the pattern displayed by the image display layer 220a. The pattern displayed by the image display layer 230a may constitute the outer frame of the pattern displayed by the image display layer 220a.

Next, the manufacturing method of the individual authentication medium according to the second embodiment and the structures of the image display layers 220a and 230a will be described with reference to FIGS. 13 to 15.

Figure 13:
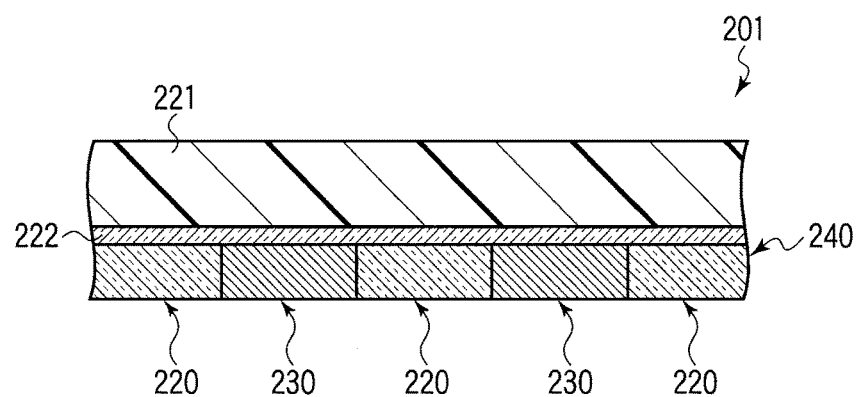
FIG. 13 is a cross sectional view schematically showing an example of a primary transfer foil that can be used for manufacturing the individual authentication according to the second embodiment.
Figure 16:
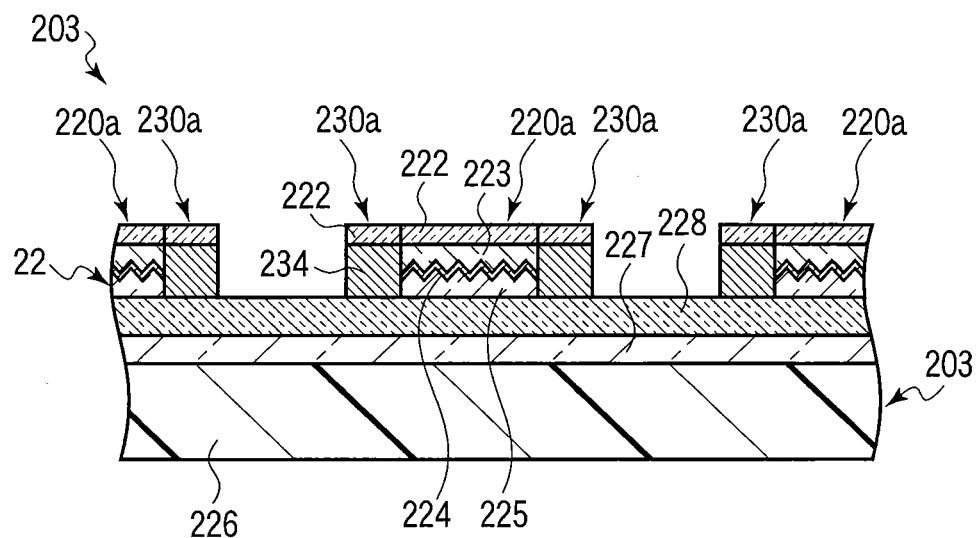
FIG. 16 is a cross sectional view schematically showing an example of a secondary transfer foil that can be manufactured using the primary transfer foil shown in FIG. 13.
Figure 17:
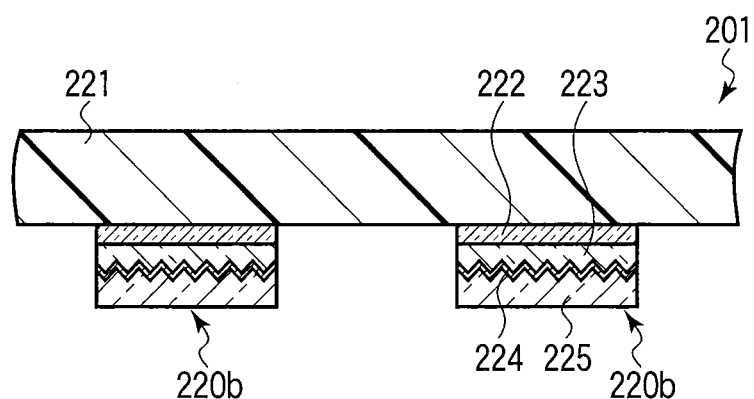
FIG. 17 is a cross sectional view schematically showing an example of the first transfer material layer included in a used primary transfer foil.
Figure 18:
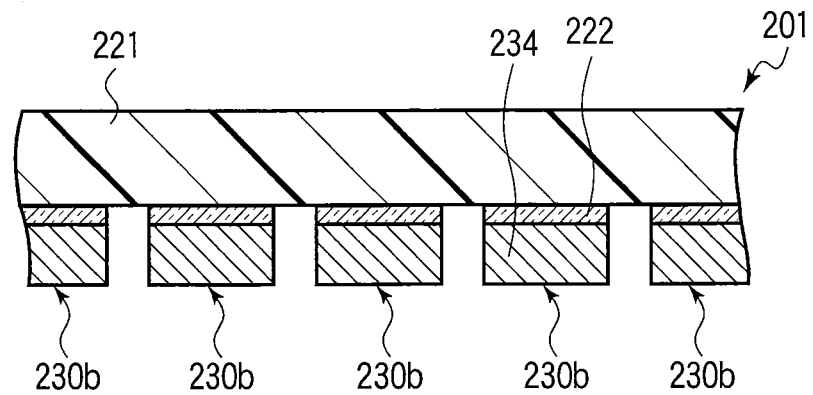
FIG. 18 is a cross sectional view schematically showing an example of the second transfer material layer included in a used primary transfer foil.

FIG. 13 is a cross sectional view schematically showing an example of a primary transfer foil that can be used for manufacturing the individual authentication according to the second embodiment. FIG. 14 is a cross sectional view schematically showing an example of the first transfer material layer included in the primary transfer foil shown in FIG. 13. FIG. 15 is a cross sectional view schematically showing an example of the second transfer material layer included in the primary transfer foil shown in FIG. 13. FIG. 16 is a cross sectional view schematically showing an example of a secondary transfer foil that can be manufactured using the primary transfer foil shown in FIG. 13. FIG. 17 is a cross sectional view schematically showing an example of the first transfer material layer included in a used primary transfer foil. FIG. 18 is a cross sectional view schematically showing an example of the second transfer material layer included in a used primary transfer foil.

The transfer foil 201 shown in FIG. 13 is, for example, a transfer ribbon. This transfer foil 201 is the same as the transfer foil 201 described with reference to FIG. 6 except that the transfer material layer 240 includes a first transfer material layer 220 and a second transfer material layer 230.

Figure 14:
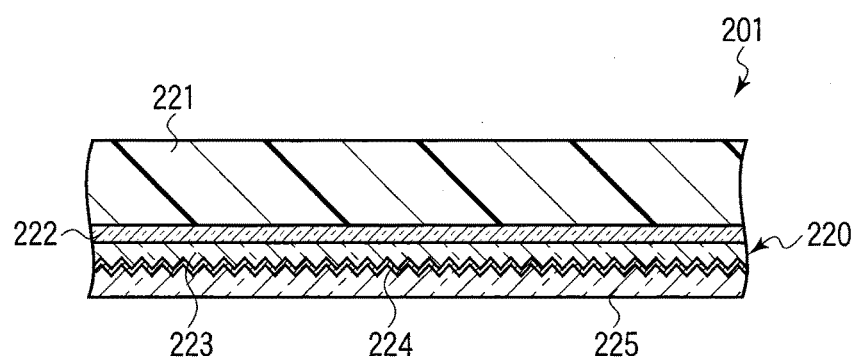
FIG. 14 is a cross sectional view schematically showing an example of the first transfer material layer included in the primary transfer foil shown in FIG. 13.

The first transfer material layer 220 is releasably supported by the support body 221 as shown in FIGS. 13 and 14. The transfer material layer 220 is the same layered structure as that of the transfer material layer 220 described with reference to FIG. 6.

Figure 15:
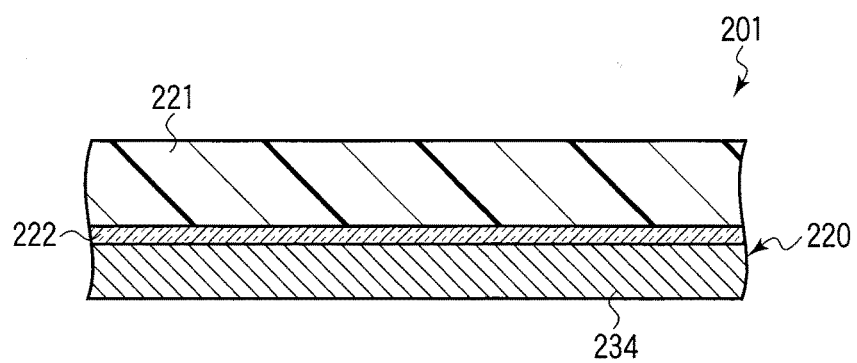
FIG. 15 is a cross sectional view schematically showing an example of the second transfer material layer included in the primary transfer foil shown in FIG. 13.

The second transfer material layer 230 is releasably supported by the support body 221 as shown in FIGS. 13 and 15. As shown in FIG. 13, the transfer material layer 230 is juxtapose to the transfer material layer 220 on the support body 221. Here, the transfer material layers 220 and 230 are alternately arranged in a direction parallel to the main surface of the support body 221.

The transfer material layer 230 includes the release layer 222 and an ink layer 233 as shown in FIG. 15.

The ink layer 233 is provided on the release layer 222. The ink layer 233 is made of, for example, a color ink. The ink layer 233 contains, for example, at least one of dye and pigment and optionally resin. The ink layer 233 includes, for example, colored layers arranged in a direction parallel to the main surface of the support body 221 and colored with yellow, magenta, cyan and black. Alternatively, the ink layer 233 may include colored layers arranged in a direction parallel to the main surface of the support body 221 and colored with red, green and blue.

The ink layer may have adhesive properties or may not have adhesive properties. In the latter case, the transfer material layer 230 may further include an adhesive layer provided on the ink layer 233. As the material of the adhesive layer, for example, thermoplastic resin can be used.

Here, the transfer material layers 220 and 230 are formed on the same support body 221. Instead, it is possible to form the transfer material layers 220 and 230 on different support bodies 221 and then connect the support bodies 221 together.

For manufacturing the individual authentication medium according to the second embodiment, for example, a facial image of a person is taken with an imaging device. Alternatively, a facial image is read from a photographic print. Thus, an image data is obtained as an electric data. The facial image is subjected to image-processing, if necessary.

Subsequently, the laminated body 203 shown in FIG. 16 is prepared. This laminated body 203 is a layer having a multilayer structure, and includes a support body 226 and also includes a protective release layer 227 and a resin layer 228 formed thereon in this order. The multilayer structure formed on the support body 226 constitutes an underlayer. The support body 226 releasably supports this underlayer.

The support body 226 may be, for example, those mentioned for the support body 221.

The protective release layer 227 plays a role of stabilizing the release of the transfer material layer 240, which includes the protective release layer 227, the diffraction image display layer 220a and the ink image display layer 230a, from the support body 226 and a role of protecting the diffraction image display layer 220a and the ink image display layer 230 from being damaged. The protective release layer 227 may be, for example, those mentioned for the release layer 222. When the resin layer 228 has a function of a release layer, the protective release layer 227 can be omitted.

The resin layer 228 has a light-transmitting property, and is transparent in a typical case. The resin layer 228 plays a role of giving sufficient strength to the above underlayer. The material of the resin layer 228 may be, for example, thermosetting resin, photo-curable resin, or thermoplastic resin. When a thermosetting resin is used, this resin layer 228 can be used as an adhesive layer for bonding the image display 22 to the cover sheet main body 21.

The resin layer 228 may include at least one of hologram and diffraction grating as a diffraction structure. For example, a relief structure may be provided as a diffraction structure on the surface of the resin layer 228. In this case, the image displayed by this diffraction structure and the image I1b displayed by the diffraction image display layer 220b and the ink image display layer 230a are superposed on each other or arranged side by side.

The laminated body 203 may further include a patterned metal reflection layer such as an opaque metal reflection layer. For example, a patterned metal reflection layer may be provided on the resin layer 228 or between the protective release layer 227 and the resin layer 228, and dots, line screen, other figures, or a combination thereof may be displayed by this metal reflection layer. Such pattern can be used for, for example, the authenticity check of the image display 22 or the individual authentication medium 100.

Subsequently, the diffraction image display layer 220a and the ink image display layer 230a having the pattern corresponding to the above facial image are formed on the laminated body 203. More specifically, based on the above image data, a part of the diffraction transfer material layer 220 and a part of the ink transfer material layer 230 are thermally transferred from the support body 221 shown in FIG. 13 onto the resin layer 228 shown in FIG. 16 as the diffraction image display layer 220a and the ink image display layer 230a, respectively. This thermal transfer is performed using a thermal head in such a manner that a part of the transfer material layer 220 thermally transferred onto the resin layer 228 has the pattern corresponding to the above facial image.

For example, a plurality of diffraction image display layers 220a are arranged to form a first pattern corresponding to parts of the facial image. In addition, a plurality of ink image display layers 230a are arranged to form a second pattern corresponding to remainders of the facial image. Typically, the second pattern corresponds to the outer frame and/or contour of the first pattern. That is, the ink image display layers 230a are typically arranged to surround the arrangement of the diffraction image display layers 220a.

The outer frame or contour formed by the ink image display layer 230a may be continuous or be discontinuous like a broken or dotted line. The shape of the pattern that the ink display layer 230a forms is determined in consideration of, for example, aesthetic value and visibility of an image, ease of genuineness check, etc.

The ink image display layer 230a can have any color. The color of the ink image display layer 230a may be determined according to the color of the substrate 21.

When using a color ink whose color is in a relation of complementary colors with the color of the substrate 21, there is a possibility that the boundary between the substrate 21 and the image displayed by the ink image display layer 230a becomes sharpened. For example, a black ink is used in the case where the substrate 21 is white-colored, while a blue ink is used in the case where the substrate is yellow-colored. In particular, when back portions are constituted by the ink image display layer 230a, the image I1b can be displayed with a high degree of visibility.

The color of the ink image display layer 230a and the color of the substrate 21 may be determined such that the colors differ from each the by about 90° in the hue circle. For example, blue, yellow or green ink is used in the case where the substrate 21 is red-colored. The color of the ink image display layer 230a and the color of the substrate 21 may be determined such that the colors differ from each the by about 120° in the hue circle. For example, blue or green ink is used in the case where the substrate 21 is red-colored. In these cases, there is a possibility that the boundary between the substrate 21 and the image displayed by the ink image display layer 230a becomes sharpened.

By transferring the patterns as described above, the transfer foil 202 including the support body 226, the protective release layer 227, the resin layer 228, the diffraction image display layer 220a and the ink image display layer 230a is obtained. The transfer foil 202 is, for example, a transfer ribbon.

Since thermal transfer using a thermal head is utilized to obtain the diffraction image display layer 220a and the ink image display layer 230a, the diffraction image display layer 220a and the ink image display layer 230a typically include a plurality of dot-shaped portions as shown in FIGS. 11 and 12. The center of each of these dot-shaped portions is located on a lattice point of a virtual planar lattice indicated by broken lines in FIG. 11.

In FIG. 11, the above planar lattice is a square lattice. However, the planar lattice may be other lattice such as triangular lattice and rectangular lattice. In FIG. 11, dot-shaped portions juxtaposed to each other are arranged such that the outlines thereof are in contact with each other at one point. In other words the diameter of each dot-shaped portion is equal to the minimum center-to-center distance of the dot-shaped portions. The adjacent dot-shaped portions may be placed away from each other. In other words, the diameter of each dot-shaped portion may be smaller than the minimum center-to-center distance of the dot-shaped portions. Alternatively, the adjacent dot-shaped portions may be arranged as if they partially overlap each other. In other words, the diameter of each dot-shaped portion may be larger than the minimum center-to-center distance of the dot-shaped portions.

The diameter of the dot-shaped portion or the minimum center-to-center distance of the dot-shaped portions is within a range of, for example, 0.085 to 0.508 mm (about 300 to about 50 dots per inch). When the facial image is displayed by the diffraction image display layer 220a, the diameter of the dot-shaped portion or the minimum center-to-center distance of the dot-shaped portions is within a range of, for example, 0.085 to 0.169 mm (about 300 to about 150 dots per inch). When this size is increased, it is difficult to display a high-resolution image on the diffraction image display layer 220. When this size is reduced, the reproducibility of the patterned shape of the diffraction image display layer 220 decreases.

The image display layers 220a and 230a may at least partially overlap each other. For example, it is possible to form the diffraction image display layer 220a and then form the ink image display layer 230a on the diffraction image display layer 220a. Alternatively, it is possible to form the ink image display layer 230a and then form the diffraction image display layer 220a on the ink image display layer 230a.

As shown in FIG. 17, in the used transfer foil 201, a part 220b of the diffraction transfer material layer 220 remains as a negative pattern of the diffraction image display layer 220a. This negative pattern can be used to check up the diffraction image display layer 220a.

As shown in FIG. 18, in the used transfer foil 201, a part 230b of the ink transfer material layer 230 also remains as a negative pattern of the ink image display layer 230a. This negative pattern can be used to check up the ink image display layer 230a.

In addition to forming the diffraction image display layer 220a and the ink image display layer 230a on the protective release layer 227 using parts of the transfer foil 201, patterns indicating the non-biometric personal information and history information such as date and time at which the diffraction image display layer 220a and the ink image display layer 230a are formed may be thermally transferred onto a separately-prepared substrate using other parts of the transfer foil 201. As a result, the used transfer foil 201 can be utilized not only for checkup of the diffraction image display layer 220a and the ink image display layer 230a but also for checkup of other information.

Before the diffraction image display layer 220a and the ink image display layer 230a are formed, another layer may be formed on the resin layer 228 or between the protective release layer 227 and the resin layer 228. For example, on the resin layer 228 or between the protective release layer 227 and the resin layer 228, a reflection layer, hologram and/or diffraction grating, or both of them may be formed.

This reflection layer may be a continuous film, or may be patterned. In the latter case, the pattern of the reflection layer may be dots, line screens, figures, or a combination thereof. This reflection layer may have a light-transmitting property, or may be opaque. Typically, this hologram and/or diffraction grating has optical characteristics different from those of the hologram and/or diffraction grating included in the diffraction structure formation layer 223.

The image display layer 210 shown in FIGS. 2 and 3 is further formed on the resin layer 228 or between the protective release layer 227 and the resin layer 228. When the image display layer 210 is formed on the resin layer 228, the image display layer 210 may be formed before the diffraction image display layer 220a and the ink image display layer 230a are formed on the resin layer 228, or may be formed on the resin layer 228 after the diffraction image display layer 220a and the ink image display layer 230a are formed on the resin layer 228.

When the image display layer 210 is formed by thermal transfer method, sublimation transfer method or hot-melt transfer method may be employed. Alternatively, both of them may be employed. The image displayed by the image display layer 210 may be a monochrome image or a color image. In the latter case, the image display layer 210 can be obtained by, for example, using one or more ink ribbons to form colored layers in four colors, i.e., yellow, magenta, cyan, and black, or form colored layers in three colors, i.e., red, green, and blue.

A layer (not shown) displaying the image 13 shown in FIG. 1 may be further formed on the resin layer 228 or between the protective release layer 227 and the resin layer 228. When the layer displaying the image 13 is formed on the resin layer 228, this layer may be formed before the diffraction image display layer 220a and the ink image display layer 230a are formed on the resin layer 228, or may be formed after the diffraction image display layer 220a and the ink image display layer 230a are formed on the resin layer 228. Alternatively, the layer displaying the image 13 may be formed on the cover sheet main body 21 instead of forming it on the resin layer 228 or between the protective release layer 227 and the resin layer 228. The layer displaying the image 13 may be formed by, for example, the same method as that described for the image display layer 210.

Subsequently, a part of the transfer material layer formed on the support body 226 that is used as the image display 22 is thermally transferred from the support body 226 onto the cover sheet main body 21 shown in FIG. 12. This thermal transfer uses, for example, hot stamp. Instead of thermal transfer using the hot stamp, thermal transfer may be performed using a heat roll or thermal head. As described above, the image display 22 is adhered to the cover sheet main body 21.

The layer displaying the image 13 may be formed on the cover sheet main body 21 as described above. An adhesive anchor layer may be formed on the cover sheet main body 21 in order to enhance the adhesion strength.

Figure 19:
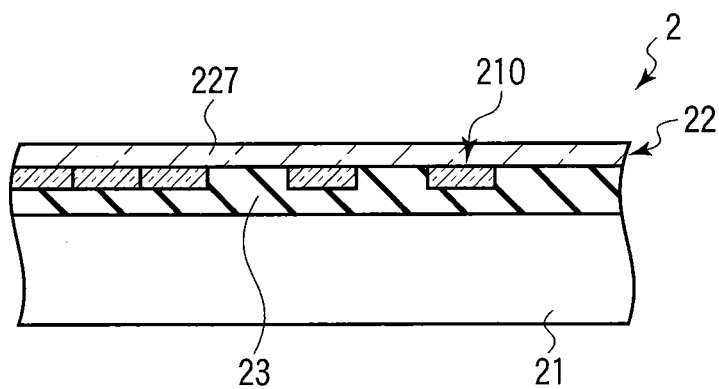
FIG. 19 is an enlarged cross sectional view schematically showing a part of an individual authentication medium according to a modified example.

When it is difficult to bond the image display 22 to the cover sheet main body 21 with high adhesion strength, the portion of the transfer material layer used as the image display 22 may be thermally transferred onto the cover sheet main body 21 via the adhesive layer 23. For example, an adhesion ribbon may be used. When using this, the adhesion strength between the image display 22 and the cover sheet main body 21 can be enhanced. According to this method, the structure in which the adhesive layer 23 is interposed between the image display 22 and the cover sheet main body 21 can be obtained as shown in FIGS. 19 and 20.

When it is difficult to bond the image display 22 to the cover sheet main body 21 with high adhesion strength, and the image display layer 210 is formed after the diffraction image display layer 220a and the ink image display layer 230a are formed, an ink ribbon additionally having a function of an adhesion ribbon may be used. In this case, it is not necessary to use an adhesion ribbon in addition to the ink ribbon.

After the image display 22 is thermally transferred onto the cover sheet main body 21 as described above, necessary steps are appropriately carried out. In this manner, the individual authentication medium 100 described with reference to FIGS. 11 and 12 is obtained.

In this method, thermal transfer using a thermal head is utilized to form the diffraction image display layer 220*a* and the ink image display layer 230*a*. The precision that can be achieved with use of a thermal head is higher than the precision that can be achieved by printing of pearl pigment.

When the diffraction image display layer 220*a* and the ink image display layer 230*a* are directly formed on the cover sheet main body 21 by thermal transfer using a thermal head, it is difficult to achieve high image quality due to roughness of the surface of the cover sheet main body 21. In contrast, in the above method, the diffraction image display layer 220*a* and the ink image display layer 230*a* are not directly formed on the cover sheet main body 21. In other words, in this method, first, the image display layer 220*a* and the ink image display layer 230*a* are formed on the protective release layer 227, and thereafter, transferred onto the cover sheet main body 21 together with the protective release layer 227. Therefore, the image quality is not greatly affected by the surface roughness of the cover sheet main body 21 and the like.

Therefore, according to this method, high quality images can be displayed by the diffraction image display layer 220*a* and the ink image display layer 230*a*.

In addition, since the ink image display layers 230*a* are disposed to border the arrangement of the diffraction image display layers 220*a*, an image can be displayed with a high degree of visibility even in the case where the surface roughness of the cover sheet main body 21, etc. has an influence on the quality of the image displayed by the diffraction image display layer 220*a*.

This image display 22 displays pieces of personal information using the hologram and/or diffraction grating and the ink layer. It is extremely difficult to tamper with the personal information, in particular biometric information, displayed by the hologram and/or the diffraction grating and the ink layer.

In this method, the image display 22 is supported by the cover sheet main body 21 by thermal transfer. Such image display 22 is easily destroyed when it is released from the cover sheet main body 21.

Therefore, it is difficult to tamper with information on this individual authentication medium 100.

In the above, the individual authentication medium 100 as a passport is described as an example. The techniques described for the individual authentication medium 100 can also be applied to an individual authentication medium other than the passport. For example, the above technique can also be applied to a visa or various cards such as ID card.

The material of the substrate onto which the image display 22 is adhered is not limited to paper. For example, the substrate onto which the image display 22 may be a plastic substrate, metal substrate ceramic substrate or glass substrate.

The image displayed by the image display layer 220*a* may include biometric information other than a facial image in addition to or instead of the facial image. The image displayed by the image display layer 220*a* may include at least one of non-biometric personal information and non-personal information in addition to or instead of the biometric information.

Examples of the present invention will be described below.

Example 1

The transfer foil 201 shown in FIG. 6 was manufactured by the following method.

First, prepared as the support body 221 was a polyethylene terephthalate film having a thickness of 12 µm. The release layer 222 and a thermoplastic resin layer were formed on the support body 221 in this order with use of a gravure coater, and were dried in an oven. Acrylic resin was used as the material of the release layer 222, and acryl polyol was used as the material of the thermoplastic resin layer. The thicknesses of the release layer 222 and thermoplastic resin layer after drying were 0.6 µm and 0.7 µm, respectively.

Subsequently, a relief structure as a hologram was formed on the surface of the thermoplastic resin layer by hot pressing using a roll embossing machine to obtain the diffraction structure formation layer 223 made of thermoplastic resin.

Then, the reflection layer 224 made of zinc sulfide was formed on the diffraction structure formation layer 223 by evaporation. The reflection layer 224 had a thickness of 80 nm.

Further, a polyester resin as thermoplastic resin was printed on the reflection layer to form the adhesive layer 225. The adhesive layer 225 had a thickness of 0.6 µm.

The transfer foil 201 shown in FIG. 6 was thus completed.

Next, the transfer foil 202 shown in FIG. 7 was manufactured by the following method. In this example, the image display layer 210 described with reference to FIGS. 2 and 3 was omitted.

First, prepared as the support body 226 was a polyethylene terephthalate film having a thickness of 25 µm. The protective release layer 227 and the resin layer 228 were formed on the support body 226 in this order with use of a gravure coater, and were dried in an oven. Acrylic resin was used as the material of the protective release layer 227, and acryl polyol was used as the material of the resin layer 228. The thicknesses of the protective release layer 227 and resin layer 228 after drying were 1.2 µm and 1.0 µm, respectively.

Subsequently, by performing thermal transfer using a thermal head, the image display layer 220*a* as a part of the transfer material layer 220 was transferred from the support body 221 onto the resin layer 228. This transfer was performed such that the image display layer 220*a* displayed a character "A".

As above, completed was the transfer foil 202 having almost the same structure as that described with reference to FIG. 7 except that the image display layer 210 was omitted.

Then, thermal transfer using a hot stamp was performed to transfer the laminated body formed on the support body 226 from the support body onto a cardboard having a surface on which an adhesive anchor layer was formed by printing. An individual authentication medium was thus completed.

When the individual authentication medium was observed, the image display layer 220*a* displayed a high quality image.

Example 2

An adhesive ribbon was manufactured by the following method. That is, an adhesive layer and back coat layer were formed on a polyethylene terephthalate film having a thickness of 4.5 µm in this order using a gravure coater, and were dried in an oven. A mixture of an epoxy resin and a polyester resin was used as the material of the adhesive layer, while an acryl silicon resin was used as the material of the back coat layer. The thicknesses of the adhesive layer and back coat layer after drying were 1.0 µm and 0.8 µm, respectively. An adhesive ribbon was thus obtained.

Next, the transfer foil 202 from which the image display layer 210 was omitted was manufactured by the same method as that described in Example 1. By performing thermal transfer using a thermal head, the image display layer 210 made of a sublimation dye was formed on the resin layer 228 of the transfer foil 202. For the heat transfer, used was an ink ribbon of sublimation transfer type. The heat transfer was performed such that the image display layer 210 displayed a character "A".

Subsequently, thermal transfer using a hot stamp was performed to transfer the laminated body of the adhesive layer and back coat layer was transferred from the polyethylene terephthalate film of the adhesive layer obtained by the above-described method on to the entire surface of the transfer foil 202 on which the image display layers 210 and 220a were formed.

Then, thermal transfer using a hot stamp was performed to transfer the laminated body formed on the support body 226 from the support body 226 onto a cardboard having a surface on which an adhesive anchor layer was formed by printing. An individual authentication medium was thus completed.

When the individual authentication medium was observed, the image display layer 220a displayed a high quality image. The image display 22 manufactured in this example had adhesion strength between the layers higher than that of the image display 22 manufactured in Example 1.

Example 3

The transfer foil 201 shown in FIG. 13 was manufactured by the following method.

First, prepared as the support body 221 was a polyethylene terephthalate film having a thickness of 12 µm. The release layer 222 and a thermoplastic resin layer were formed on the support body 221 in this order with use of a gravure coater, and were dried in an oven. Acrylic resin was used as the material of the release layer 222, and acryl polyol was used as the material of the thermoplastic resin layer. The thicknesses of the release layer 222 and thermoplastic resin layer after drying were 0.6 µm and 0.7 µm, respectively.

Subsequently, a relief structure as a hologram was formed on the surface of the thermoplastic resin layer by hot pressing using a roll embossing machine to obtain the diffraction structure formation layer 223 made of thermoplastic resin.

Then, the reflection layer 224 made of zinc sulfide was formed on the diffraction structure formation layer 223 by evaporation. The reflection layer 224 had a thickness of 80 nm.

Further, a polyester resin as thermoplastic resin was printed on the reflection layer to form the adhesive layer 225. The adhesive layer 225 had a thickness of 0.6 µm.

The transfer foil 201 shown in FIG. 13 was thus completed.

Next, the transfer foil 202 shown in FIG. 16 was manufactured by the following method. In this example, the image display layer 210 described with reference to FIGS. 2 and 3 was omitted.

First, prepared as the support body 226 was a polyethylene terephthalate film having a thickness of 25 µm. The protective release layer 227 and the resin layer 228 were formed on the support body 226 in this order with use of a gravure coater, and were dried in an oven. Acrylic resin was used as the material of the protective release layer 227, and acryl polyol was used as the material of the resin layer 228. The thicknesses of the protective release layer 227 and resin layer 228 after drying were 1.2 µm and 1.0 µm, respectively.

Subsequently, by performing thermal transfer using a thermal head, the diffraction image display layer 220a and the ink image display layer 230a as parts of the transfer material layer 220 were transferred from the support body 221 onto the resin layer 228.

FIG. 21 is an enlarged view schematically showing the arrangement of the diffraction image-displaying layer and the ink image-displaying layer formed in Example 3. The transfer was performed such that the arrangement of the diffraction image display layers 220a displayed a character "A", while the arrangement of the ink image display layers 230a bordered the character "A".

As above, completed was the transfer foil 202 having almost the same structure as that described with reference to FIG. 16 except that the image display layer 210 was omitted.

Then, thermal transfer using a hot stamp was performed to transfer the laminated body formed on the support body 226 from the support body 226 onto a cardboard having a surface on which an adhesive anchor layer was formed by printing. An individual authentication medium was thus completed.

When the individual authentication medium was observed, the diffraction image display layer 220a and the ink image display layer 230a displayed high quality images.

Example 4

An adhesive ribbon was manufactured by the following method. That is, an adhesive layer and back coat layer were formed on a polyethylene terephthalate film having a thickness of 4.5 µm in this order using a gravure coater, and were dried in an oven. A mixture of an epoxy resin and a polyester resin was used as the material of the adhesive layer, while an acryl silicon resin was used as the material of the back coat layer. The thicknesses of the adhesive layer and back coat layer after drying were 1.0 µm and 0.8 µm, respectively. An adhesive ribbon was thus obtained.

Next, the transfer foil 202 from which the image display layer 210 was omitted was manufactured by the same method as that described in Example 3. By performing thermal transfer using a thermal head, the image display layer 210 made of a sublimation dye was formed on the resin layer 228 of the transfer foil 202. For the heat transfer, used was an ink ribbon of sublimation transfer type. The heat transfer was performed such that the image display layer 210 displayed a character "A".

Subsequently, thermal transfer using a hot stamp was performed to transfer the laminated body of the adhesive layer and back coat layer was transferred from the polyethylene terephthalate film of the adhesive layer obtained by the above-described method on to the entire surface of the transfer foil 202 on which the image display layers 210, 220a and 230a were formed.

Then, thermal transfer using a hot stamp was performed to transfer the laminated body formed on the support body 226 from the support body 226 onto a cardboard having a surface on which an adhesive anchor layer was formed by printing. An individual authentication medium was thus completed.

When the individual authentication medium was observed, the diffraction image display layer 220a and the ink image display layer 230a displayed high quality images. The image display 22 manufactured in this example had adhesion strength between the layers higher than that of the image display 22 manufactured in Example 3.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image display that is to be transferred from a support onto a substrate and displays an image including personal information, comprising:
   a base layer releasably supported by the support, having a light-transmitting property,
   a first pattern including a hologram and/or diffraction grating and transferred onto a main surface of the base layer, the first pattern displaying a first image including at least a piece of the personal information, the first pattern including dot-shaped portions, each center of the dot-shaped portions being located on a lattice point of a virtual planar lattice, and a diameter of the dot-shaped portion or a minimum center-to-center distance of the dot-shaped portions being within a range of 0.085 to 0.508 mm; and
   a second pattern displaying a second image, comprising an ink, and transferred onto the main surface of the base layer, wherein
   at least a part of the first pattern and at least a part of the second pattern are juxtaposed on a same plane parallel to the main surface of the base layer, and
   the second pattern surrounds the first pattern, and the second image defines a contour of the first image.

2. The image display according to claim 1, wherein the ink is made of a color ink.

3. The image display according to claim 2, wherein a color of the color ink and a color of the substrate are complementary colors.

4. The image display according to claim 1, wherein the second pattern displays the second image by utilizing light absorption.

5. The image display according to claim 1, wherein the first image includes a piece of the personal information, while the second image includes another piece of the personal information.

6. The image display according to claim 5, wherein the first image includes first personal information, the second image includes second personal information, and the first and second personal information are information of the same person.

7. The image display according to claim 6, wherein at least one of the first and second images includes biometric information.

8. The image display according to claim 6, wherein the first and second images include the same facial image.

9. The image display according to claim 1, further comprising an adhesive layer facing the base layer with the first pattern interposed therebetween.

10. An individual authentication medium comprising:
    the image display according to claim 1; and
    the substrate having the image display transferred from the support.

11. A method of manufacturing an image display that is to be transferred from a support onto a substrate and displays an image including personal information, comprising:
    transferring a part of a transfer material layer including a hologram and/or diffraction grating onto a base layer releasably supported by the support by a thermal transfer method using a thermal head so as to form a first pattern and a second pattern on a main surface of the base layer, the first pattern including a part of the hologram and/or diffraction grating and displaying a first image including at least a piece of the personal information, the first pattern including dot-shaped portions, each center of the dot-shaped portions being located on a lattice point of a virtual planar lattice, a diameter of the dot-shaped portion or a minimum center-to-center distance of the dot-shaped portions being within a range of 0.085 to 0.508 mm, the second pattern including an ink, displaying a second image, and surrounding the first pattern, at least a part of the first pattern and at least a part of the second pattern being juxtaposed on a same plane parallel to the main surface of the base layer, and the second image defining a contour of the first image.

12. A method of manufacturing an individual authentication medium, comprising:
    forming an image display comprising a base layer and a first pattern, and a second pattern and displaying an image including personal information, wherein the formation of the image display includes transferring a part of a transfer material layer including a hologram and/or diffraction grating onto the base layer releasably supported by a support by a thermal transfer method using a thermal head so as to form the first pattern and the second pattern on a main surface of the base layer, the first pattern including a part of the hologram and/or diffraction grating and displaying the image including at least a piece of the personal information, the first pattern including dot-shaped portions, each center of the dot-shaped portions being located on a lattice point of a virtual planar lattice, a diameter of the dot-shaped portion or a minimum center-to-center distance of the dot-shaped portions being within a range of 0.085 to 0.508 mm, the second pattern including an ink, displaying a second image, and surrounding the first pattern, at least a part of the first pattern and at least a part of the second pattern being juxtaposed on a same plane parallel to the main surface of the base layer, and the second image defining a contour of the first image; and
    transferring the image display from the support onto a substrate of the individual authentication medium.

13. The image display according to claim 1, wherein the first pattern further includes a release layer facing the base layer with the hologram and/or diffraction grating interposed therebetween.

14. The individual authentication medium according to claim 10, wherein the first pattern further includes a release layer interposed between the substrate and the hologram and/or diffraction grating.

15. The method according to claim 11, wherein the transfer material layer further includes a release layer interposed between the support and the hologram and/or diffraction grating.

* * * * *